April 17, 1934.                 J. R. PARSONS                  1,954,889
                   PROCESS OF TREATING CERAMIC MATERIAL
                            Filed July 13, 1931
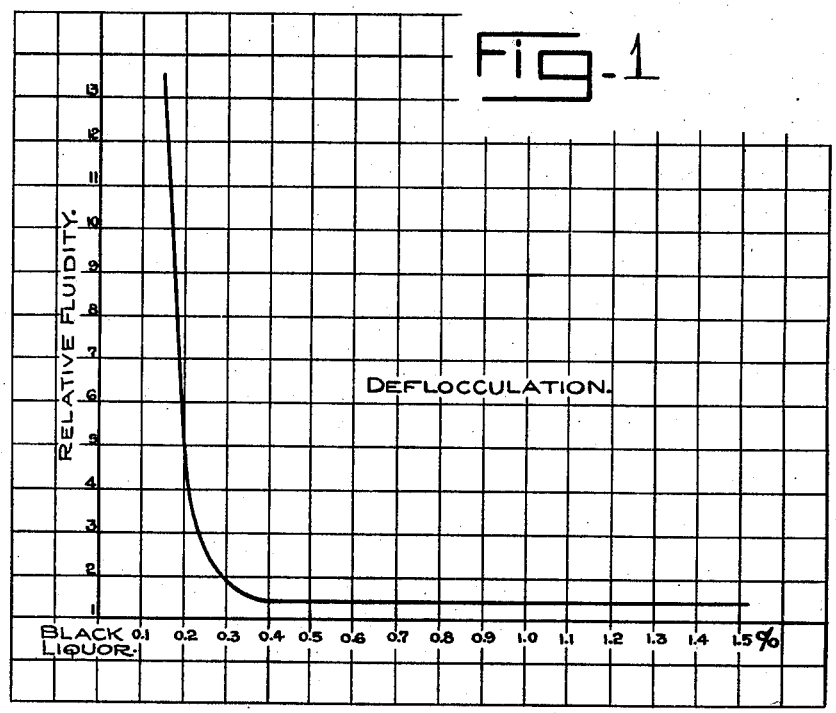
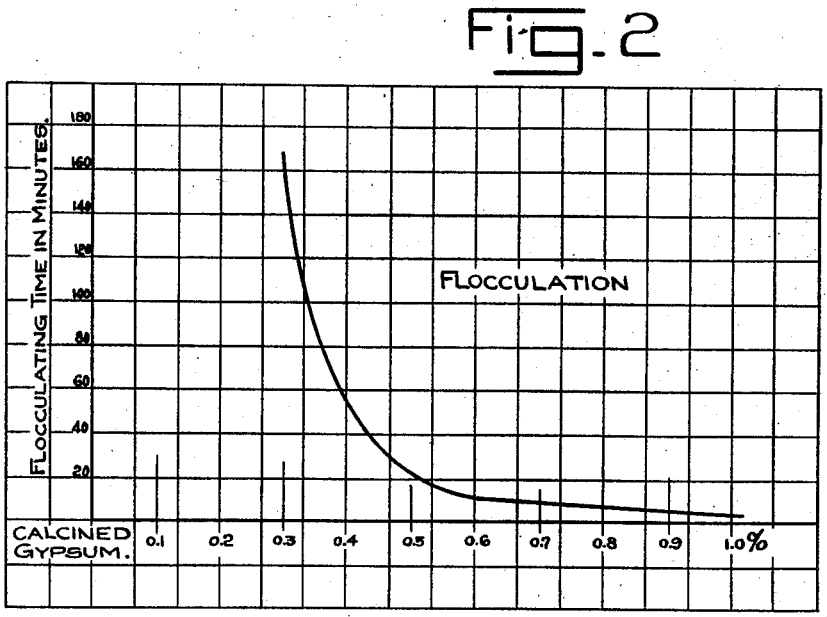
INVENTOR
JOSEPH R. PARSONS.
BY
ATTORNEY Patented Apr. 17, 1934

1,954,889

UNITED STATES PATENT OFFICE 1,954,889

PROCESS OF TREATING CERAMIC MATERIAL

Joseph R. Parsons, Chicago, Ill., assignor to United States Gypsum Company, Chicago, Ill., a corporation of Illinois Application July 13, 1931, Serial No. 550,317

15 Claims. (Cl. 25—156)

This invention relates to the process of treating ceramic materials, and has reference more particularly to a process of the class described in which clay bodies are deflocculated, a delayed flocculent is added, and the resulting clay slip is poured into molds to solidify under the action of the delayed flocculating reagent.

The clay particles in water suspension hold in their immediate vicinity various positive ions, a state of combination commonly called adsorption. Each of these ions can be replaced by other positive ions under suitable conditions, i. e. (1) The presence of an excess of the replacing ion, the replacing action then being due to a mass action effect or (2) the presence along with the replacing ion of an anion with which the ion being replaced will form an insoluble or non-ionized salt. The viscosity of a clay slip is greatly dependent on which ions are adsorbed by the clay particles, the monovalent ions except H+ tending to keep the clay particles separated in which case the slip is said to be deflocculated and is comparatively fluid while the divalent, trivalent and hydrogen ions tend to cause the individual clay particles to cling together in aggregates and in this state the slip is said to be flocculated and is comparatively viscous. The quantity of electrolyte which must be added to furnish sufficient ions to bring about the desired effect is small, usually well under 1% of the weight of dry clay present. This is particularly true with respect to the flocculation of a deflocculated slip using either acids, which furnish H+ ions, or salts of di- or tri-valent metals which give the ions of those metals. The amounts of electrolytes required for deflocculation and for flocculation are not necessarily stoichiometrically equal.

When the clay is deflocculated and is in a neutral or alkaline condition, the clay particles range in size between 0.1 microns and 1.0 millimicrons in size, and move independently of each other so that they cannot be seen under the ordinary microscope. The flocculated clay is in a coagulated form and the massing or grouping of the particles into clusters can be seen under the microscope. The flocculated clay appears to be dense and the particles collect in loose agglomerations, these groups acting to hold water in their voids.

In the molding of ceramic wares, it has been the practice to pour a clay slip into a plaster mold, the mold serving to withdraw the water from the slip until the material is stiff enough to handle. After a prolonged period in the mold, the piece is withdrawn from the mold and the plaster mold must be allowed to dry after several pieces have been formed before it can be again used. It has also been heretofore difficult to mold clay articles in permanent metal molds from thin clay slips because of the fact that the molded pieces could not be set up or stiffened sufficiently to remove the article from the mold.

An object of this invention, therefore, is to provide a process of treating ceramic or clay slips in which a flocculating agent is added to a deflocculated slip so that a controlled delayed stiffening action takes place in the mold after pouring.

Another object of the invention is to provide a process of preparing light weight heat insulating and sound absorbing ceramic tiles in which foam air cells are locked in the deflocculated ceramic mix by a controlled delayed flocculation.

A further object of the invention is to provide a process of molding ceramic bodies in metal molds where setting or flocculation of the clay slip is obtained by salt capable of delayed flocculation or coagulation of the clay; also to improve ceramic processes and compositions in other respects hereinafter specified and claimed.

Reference is to be had to the accompanying drawing forming a part of this specification, in which Fig. 1 is a graphical chart showing the effect of different amounts of deflocculating agents upon the relative fluidity of the clay slip, and Fig. 2 is a graphical chart showing the flocculating time of a clay slip depending upon the amount of flocculating agent used.

In preparing a clay slip for molding, following the process of my present invention, I mix a clay with water, and with a small quantity of sodium silicate, sodium carbonate, sodium hydroxide or other soluble salts which have a deflocculating effect. The resulting deflocculated clay slip should have a consistency so that the slip may be readily poured into the mold and fill all of the recesses in the mold with the sharpest detail. A deflocculating agent which I prefer to use is black liquor or waste cellulose liquor obtained as a by-product of the soda process in the paper industry. This black liquor is alkaline in nature and contains ligneous bodies which serve as a bonding agent for the clay when dry, and also contains about 50% water. Fig. 1 of the drawing shows the effect on the relative fluidity of the clay slip by the addition of various amounts of black liquor thereto.

It should be understood that various kinds of clays can be used for molding clay articles, but a characteristic formula to produce a white ware body is shown below:

| | |
|---|---|
| Georgia kaolin | 600 grams |
| Ball clay | 400 grams |
| Flint | 500 grams |
| Feldspar | 470 grams |
| Whiting | 300 grams |
| Water | 1200 cc's. |

After preparing the deflocculated clay slip, the flocculating agent can be added in an amount varying from 0.25% to 0.5% of the clay content. By varying the amount of flocculating agent added to the clay slip, the flocculating time can be varied from 2 minutes to 2 hours as seen in Fig. 2 of the drawing. The flocculating agent used for accomplishing the delayed flocculation, should be carefully selected to give the desired action. A substance which ionizes to give a flocculating ion ($H^+$, $Ca^{++}$, $Mg^{++}$ etc.) is to be used. Gypsum or calcined gypsum is the reagent recommended by me for this purpose, but other reagents which are more or less satisfactory are barium sulphide, calcium sulphide and zinc sulphate. The barium sulphide is preferably used in a concentration of 1.2% of the dry weight of the body and the calcium sulphide and zinc sulphate are used in the proportions of 0.4% by weight of the dry body. The zinc sulphate has greater solubility than the other reagents mentioned and this higher solubility is somewhat overcome by introducing it in the form of coarser crystals. A crystalline zinc sulphate suitable for this purpose may have about the following screen analysis:—

| | Percent |
|---|---|
| On 16 mesh | 14.2 |
| On 20 mesh | 23.1 |
| On 30 mesh | 31.3 |
| On 40 mesh | 26.3 |
| On 50 mesh | 1.4 |
| Thru 50 mesh | 3.7 |

Ordinarily enough of the flocculating agent is added to the slip so that the flocculating time of the slip is set for 10 to 15 minutes.

After the flocculating agent has been added to the slip, the latter is immediately poured into the plaster, metal or other mold, the shape of the article to be cast, and in the time predetermined for flocculation, the slip stiffens up or coagulates sufficiently so that the piece can be removed from the mold. After removal from the mold, the casting or piece of ceramic ware is preferably allowed to air dry for a short time, and then is placed in a dryer at a temperature somewhat below 212° F. After drying, the ceramic pieces are fired for a period of 14 to 16 hours at a temperature ranging from 2200° F. to 2300° F. This firing temperature can be lowered somewhat by using a longer firing time.

While my improved process involving deflocculation, followed by flocculation, is generally applicable to a variety of ceramic products, I have found it especially useful in the manufacture of light weight, heat insulating tiles or bricks, or ceramic tiles which are porous in character and are used as a lining for rooms for the absorption of sound or acoustical correction. In the manufacture of such products, it has been the practice to introduce a stable foam into the clay mix to make the resulting ceramic article porous and light in weight.

In carrying out this particular type of process, an argilaceous or clay body is mixed with enough water to bring it to a thick slip. The alkaline deflocculating agent previously described is now added to the thick clay slip, causing the slip to become deflocculated and thin in character with a low viscosity, but still containing comparatively little water. As shown in Fig. 1, the addition of a very small amount of deflocculating agent will cause a very great reduction in the viscosity or relative fluidity of the slip. A stable foam is now prepared by beating a water solution of a foaming agent, such as soap bark; licorice root extract; casein, and rosin, together with a small amount of alkali. This stable foam is now thoroughly mixed with the deflocculated clay slip, and if desired, wood fiber can also be thoroughly mixed in. When mixing is complete, the flocculating agent previously described is added and the mixing continues for a short period to insure thorough incorporation of the flocculating agent. The slip, still in a fluid form, is now poured into the mold, and within a few minutes after pouring into the mold, the effect of the delayed flocculating agent is felt and the slip stiffens up and becomes solid enough so that it may be removed from the mold. The article is now dried at room temperature, or may be dried at an elevated temperature in a drying oven. The article is then put into the kiln and fired, so that the clay is hardened or vitrified and any fiber or other organic matter contained in the article is burned out. After burning, the casts or shapes are cooled, removed, and if the article is to be used for acoustical absorption, the surface may be prepared by mechanically finishing off the surface to open up the pores for the absorption of sound. The edges of the tiles may also be beveled to give a more pleasing architectural effect. Pigments may be added to the mixture prior to flocculation, drying and burning, to produce any colored tile desired. Lacquers, enamels, paint, flake metal liquids, etc. may be applied to the acoustical surface if desired to add to the appearance, care being taken not to close up the pores relied upon to absorb the sound waves.

For every 2000 grams of the dry clay body, about 1650 cc. of water are necessary, but this water is varied, depending upon the exact character of the clay used. A preferred foam solution to use for preparing an acoustical tile may contain 0.8% of soap bark, to which has been added 20% by weight of fine kaolin. This foam formula produces a fine bubble structure which is strong and does not break down when incorporated into the clay slip. The fine kaolin produces a foam which is stabilized and does not break down. Other stabilizing agents may be used in the foam formula, such as gums, dextrins, etc.

For the wood fiber, I prefer a light, non-staining wood, such as bass wood, poplar, maple, etc. It is essential that the fiber does not lose its strength when wet, but that it helps support the body and prevents excessive shrinkage in drying. It is quite possible to use a wide variety of sizes of fiber, but I prefer a fiber whose diameter is about $\frac{1}{32}$" maximum, and whose maximum length is about ¾", with a greater percentage of the fiber about ¼" in length, grading down to dust. I find it possible to use other types of fibrous, organic materials, which can be burned out on firing the tile. Granular organic material, such as sawdust, may be used to replace a portion of the wood fiber and the foam. The space occupied by the fiber or organic matter, provides corridors or capillaries which connect up the cells provided by the foam, so that the sound can travel into the body of the material through these inter-communicating passages. The composition is preferably molded so that the fibers extend substantially perpendicular to the face of the tile in order to obtain the maximum of sound absorbing efficiency. However, for tiles intended for heat insulation, the composition is preferably molded in such a way that the fibers extend parallel to the face, so that the pores are not inter-communicating from the face of the tile inwardly, but constitute closed air spaces.

A decorative glaze may also be applied to the surface of the body prior to firing, care being taken in the manufacture of acoustical tile to prevent the glaze from closing up the larger surface pores. If the tile is not to be used for acoustical purposes, but only for heat insulation, the glaze may be such as to close all the surface pores and give a smooth, glossy surface.

As an example of my improved complete formula, the following is given:

|  | Percent |
|---|---|
| Clay body | 56.3 |
| Water | 21.3 |
| Wood fiber | 5.6 |
| Deflocculent and bonding agent— |  |
| Black liquor | 0.92 |
| Foam solution— |  |
| Water | 12.2 |
| Clay (kaolin) | 3.6 |
| Soap bark | 0.12 |
| Total | 100 |
| Flocculating agent approximately | .5% |
|  | (see curves) |

The amount of re-agents to effect deflocculation and flocculation can readily be determined from the chart shown in Figs. 1 and 2 depending somewhat on the type of clay used. It should be understood that the proportions shown in the above formula can be varied to a considerable extent, and other gas generating and density reducing re-agents may be used instead of a foam, such as aluminum powder and sodium hydroxide or black liquor, so as to produce the air cells in the finished body. Some clays occur in a naturally deflocculated state so that a deflocculating agent will not be necessary for such clays.

I would state in conclusion that, while illustrated examples constitute a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. A cellular plastic composition suitable for drying and firing to the point of vitrification, comprising clay, water, foam, a deflocculating agent, and a flocculating agent capable of coagulating the mixture after same has been formed into shape.

2. A ceramic composition comprising clay, water, a deflocculating agent, a density reducing agent, and a flocculating agent from the group consisting of calcium sulphate, barium sulphide, calcium sulphide, and zinc sulphate.

3. The process of preparing light weight material, which comprises mixing a deflocculated clay slip with foam, adding a flocculating agent having a delayed flocculating action, and drying and firing the flocculated mixture to produce a porous material.

4. The process of preparing a porous material, which comprises mixing clay with less than its weight of water, deflocculating said clay by the addition of an electrolyte solution to render the clay slip of high relative fluidity, mixing a density reducing agent with said deflocculated clay slip, adding a flocculating agent to the mixture to decrease the relative fluidity thereof, drying the mixture, and burning the dried mixture at a high temperature to the point of vitrification to produce a porous material.

5. The process of producing a cellular clay product which comprises mixing clay with water, adding to the mixture an alkaline-reacting substance to effect deflocculation of said clay, incorporating a tenacious foam with the thus produced mixture, adding thereto a reagent capable of overcoming the deflocculation and causing a delayed flocculating action so that when said flocculation occurs the foam-structure will be substantially retained and the bubbles of said foam entrapped, shaping the resultant mixture into form, drying said form, and burning the same.

6. The process of producing a cellular clay product which comprises mixing clay with water, adding alkaline black-liquor to the mixture to deflocculate the clay, adding a tenacious foam and incorporating the same throughout the mixture, adding thereto a flocculating agent selected from the group consisting of gypsum, calcium sulfide, barium sulfide and zinc sulfate and pouring the resulting mixture into a mold to form the same, removing the form after the mixture has set and entrapped the foam, drying the form, and burning the same to form the said vitrified product.

7. The process of producing a cellular vitrified clay product which comprises preparing a mixture of clay and water; adding a deflocculating agent thereto consisting of a material selected from the group consisting of black-liquor, sodium hydroxide, sodium carbonate and sodium silicate; adding to the deflocculated mixture a tenacious foam made from water, soap-bark and kaolin and incorporating the foam uniformly through the mixture; adding a flocculating agent capable of yielding an ion selected from the group consisting of hydrogen, barium, calcium and zinc; placing the resulting mixture rapidly into a mold and allowing it to set up therein; removing the molded object thus produced, drying the same, and then burning the same to vitrify it.

8. The process of producing a connectedly porous and cellular material of the ceramic type which comprises the steps of mixing clay with water; deflocculating the clay by addition of an alkaline-reacting substance thereto; forming a tenacious foam containing dispersed therein short ligneous fibers; incorporating said foam with the deflocculated clay mixture; adding to the resulting mixture a flocculating agent having a relatively slow action; pouring the entire mixture rapidly into a mold to shape the same into predetermined form and allowing it to set up therein; removing the thus molded object and drying the same; and finally burning said object in a kiln whereby the ligneous fiber burns away forming interconnecting channels between the individual cells of the foam-like structure of the product.

9. The process of producing a porous cellular ceramic mass which comprises the steps of preparing a slip from clay and water; deflocculating the clay by adding to said slip an alkaline-reacting material selected from the group consisting of sodium hydroxide, sodium carbonate, sodium silicate, and black-liquor; adding aluminum powder to the mixture to cause the liberation of a gas therein whereby the mixture is rendered of a foamy consistency; adding a flocculating reagent to the mixture to cause the same to set up and thus to trap the gaseous bubbles and to retain the fomaceous structure of the mixture; and subsequently drying the mixture and burning the same to form the ceramic mass.

10. The process of producing a cellular ceramic product which comprises the steps of forming a mixture of clay and water; adding thereto an alkaline-reacting deflocculating agent to deflocculate the clay so as to reduce the viscosity of the clay-water mixture; converting said mixture into a foamy mass by the introduction of a gaseous density-reducing agent thereinto; adding to the thus formed foamy mass a reagent from the group consisting of gypsum, calcium sulfide, barium sulfide and zinc sulfate to cause retarded flocculation of the mass to cause the same to set up and thus to entrap the gaseous density-reducing agent and to preserve the foam-like structure of the mass; and subsequently drying and burning said mass.

11. The process of producing a connectedly porous cellular burnt ceramic mass which comprises the steps of adding to a deflocculated clay-water mixture a foam made from a solution of soap-bark and wood-fiber, forming the resulting foamy mass into shape, flocculating the clay to set the foamy structure, drying the mass thus formed, and burning the same to vitrify the clay and to burn out the wood fiber whereby interconnected cellularity will be imparted to the mass by the destruction of the wood fiber thus connecting the individual cells of the foam-like structure of the mass.

12. A burnt ceramic product of foam-like structure, having the foam-like-arranged voids thereof interconnected by small passages to render the product porous as well as cellular.

13. A burnt ceramic product of foam-like structure, consisting of burnt clay, and a substance selected from the group consisting of barium sulfide, calcium sulfide and zinc sulfate.

14. A burnt ceramic tile having sound-absorbing properties consisting a body of clay containing voids of foam-like formation and interconnecting pores therein extending substantially in a plane at right-angles to the larger surfaces of said tile.

15. A burnt ceramic tile having sound-insulating properties consisting of a body of clay containing voids of foam-like formation and interconnecting pores therein extending substantially in a plane parallel to the larger surfaces of the tile.

JOSEPH R. PARSONS.